United States Patent
Tian

(10) Patent No.: US 11,243,737 B2
(45) Date of Patent: Feb. 8, 2022

(54) METHOD AND SYSTEM FOR REMOTE COLLABORATION

(71) Applicants: Guangzhou Shiyuan Electronics Co., Ltd., Guangzhou (CN); Guangzhou Shirui Electronics Co. Ltd., Guangzhou (CN)

(72) Inventor: Nan Tian, Guangzhou (CN)

(73) Assignees: GUANGZHOU SHIYUAN ELECTRONICS CO., LTD., Guangdong (CN); GUANGZHOU SHIRUI ELECTRONICS CO. LTD., Guangdong (CN)

( * ) Notice: Subject to any disclaimer, the term of this patent is extended or adjusted under 35 U.S.C. 154(b) by 212 days.

(21) Appl. No.: 16/319,767

(22) PCT Filed: Sep. 27, 2017

(86) PCT No.: PCT/CN2017/103782
§ 371 (c)(1),
(2) Date: Jan. 22, 2019

(87) PCT Pub. No.: WO2018/166173
PCT Pub. Date: Sep. 20, 2018

(65) Prior Publication Data
US 2021/0294559 A1    Sep. 23, 2021

(30) Foreign Application Priority Data
Mar. 17, 2017    (CN) .......................... 201710161867.9

(51) Int. Cl.
*G06F 3/0484*    (2013.01)
*G06F 3/14*    (2006.01)
(Continued)

(52) U.S. Cl.
CPC ........ *G06F 3/1454* (2013.01); *G06F 3/03543* (2013.01); *G06F 3/0487* (2013.01);
(Continued)

(58) Field of Classification Search
CPC .... G06F 3/1423; G06F 3/1446; G06F 3/1454; G06F 3/033; G06F 3/0354;
(Continued)

(56) References Cited

U.S. PATENT DOCUMENTS

| | | | |
|---|---|---|---|
| 9,170,661 B2 | 10/2015 | Moscovitch | |
| 2007/0022234 A1* | 1/2007 | Yang | G06F 3/038 |
| | | | 710/62 |

(Continued)

FOREIGN PATENT DOCUMENTS

| | | |
|---|---|---|
| CN | 101276253 A | 10/2008 |
| CN | 102520850 A | 6/2012 |

(Continued)

OTHER PUBLICATIONS

International Search Report for PCT/CN2017/103782, dated Jan. 9, 2018, 6 pages.

*Primary Examiner* — Michael J Eurice
(74) *Attorney, Agent, or Firm* — Zhong Law, LLC

(57) ABSTRACT

The present disclosure relates to a method and a system for remote collaboration, the method includes: receiving mouse operation information of a user in the master computer which is captured and transmitted by the master computer; detecting a position of the mouse cursor on the master split screen in accordance with the mouse operation information, then when the cursor arrives at a boundary of the master split screen and continues to move in a direction away from the master split screen, detecting a current split screen connecting to the boundary, and displaying the cursor on the current split screen; and receiving interaction information transmit-
(Continued)

ted by the master computer, and transferring the interaction information to a current slave computer corresponding to the current split screen, so as to cause the current slave computer to execute the interaction information, where the interaction information is the information which is obtained and intercepted by the master computer when the master computer detects interaction initiated by the user with the master computer. The present disclosure can realize the collaboration function in wireless screen transmission based on the display of multiple sources on the same screen, thus rendering the operations convenient.

10 Claims, 3 Drawing Sheets

(51) Int. Cl.
  *G06F 3/0354* (2013.01)
  *G06F 3/0481* (2013.01)
  *G06F 3/0487* (2013.01)
  *G06F 9/54* (2006.01)
(52) U.S. Cl.
  CPC .......... *G06F 3/04812* (2013.01); *G06F 9/547* (2013.01); *G06F 3/0484* (2013.01)

(58) Field of Classification Search
  CPC ...... G06F 3/03543; G06F 3/038; G06F 3/041; G06F 3/0481; G06F 3/04812; G06F 3/0484; G06F 3/0487; G06F 9/451; G06F 9/452; G06F 9/547; G06F 15/16; G06F 15/173; G06F 21/35; G06F 2203/0383; G09G 5/08; G09G 2370/24
  See application file for complete search history.

(56) References Cited

U.S. PATENT DOCUMENTS

| | | | | |
|---|---|---|---|---|
| 2011/0047306 | A1* | 2/2011 | Dickens | G06F 3/1446 710/73 |
| 2011/0310030 | A1* | 12/2011 | Mundt | G06F 1/1647 345/173 |
| 2012/0011280 | A1* | 1/2012 | Gilboa | G06F 9/451 709/246 |
| 2017/0351396 | A1* | 12/2017 | Passeri | G06F 3/0481 |

FOREIGN PATENT DOCUMENTS

| | | |
|---|---|---|
| CN | 103268208 A | 8/2013 |
| CN | 107122148 A | 9/2017 |

* cited by examiner

METHOD AND SYSTEM FOR REMOTE COLLABORATION

CROSS-REFERENCE TO RELATED APPLICATIONS

This application is a continuation of International Application No. PCT/CN2017/103782, filed on Sep. 27, 2017, which claims priority to Chinese Patent Application No. 201710161867.9, filed on Mar. 17, 2017, both of which are hereby incorporated by reference in their entireties.

TECHNICAL FIELD

The present disclosure relates to the field of computer information processing technologies, and in particular, to a method and a system for remote collaboration.

BACKGROUND

The wireless screen transmission technology mainly enables synchronous presentation of contents and sounds on a receiving end apparatus, such as a projector, a television and a flat panel-for-conference with the contents and sounds which are displayed on a screen of a source end apparatus for presentation. The technology is able to combine high processing capacity of the source end apparatus (e.g., a computer) and good-quality presentation effects of the receiving end apparatus (e.g., a television or a flat panel-for-conference), and is thus widely used.

Prior wireless screen transmission technologies are mainly realized by adopting screen transition software applications, where corresponding screen transition software applications are installed on both of the source apparatus and the receiving apparatus, with the source end apparatus and the receiving end apparatus being in the same wireless network, the wireless screen transmission of multimedia information (including pictures, audios, videos and the like) is thus realized. When multiple source end apparatuses simultaneously perform wireless screen transmission with a receiving end apparatus, contents from multiple sources can be displayed on the same screen, i.e., multiple source end apparatuses may assign and display the contents on their respective screens on a receiving end apparatus. For example, four computers simultaneously perform wireless screen transmission with one flat panel-for-conference, the desktops of these four computers may be displayed on the flat panel-for-conference in the form of four split screens.

In the prior software screen transition solutions, users of each computer can only control his own computer which is to be displayed on a corresponding split screen, for example, user 1 can only operate computer 1 which is to be displayed through the screen transition on a corresponding split screen 1. However, sometimes collaboration may be required during the conference such that, for example, user 2 expects user 1 to perform certain operations on his computer 2 and to display computer 2 on the flat panel-for-conference through the screen transition, but this cannot be realized by prior software screen transition solutions.

SUMMARY

To this end, embodiments of the present disclosure provide a method for remote collaboration capable of realizing remote collaboration in wireless screen transmission.

The method for remote collaboration in accordance with one embodiment of the present disclosure is applied in a receiving terminal, where the receiving terminal performs wireless screen transmission with a master computer and at least one slave computer simultaneously, and images of the master computer and all the slave computers are respectively and correspondingly displayed on a master split screen and other split screens of the receiving terminal, the method includes:

receiving mouse operation information of a user in the master computer which is captured and transmitted by the master computer;

detecting a position of a mouse cursor on the master split screen in accordance with the mouse operation information, then when the cursor arrives at a boundary of the master split screen and continues to move in a direction away from the master split screen, detecting a current split screen connecting to the boundary, and displaying the cursor on the current split screen; and receiving interaction information transmitted by the master computer, and transferring the interaction information to a current slave computer corresponding to the current split screen, so as to cause the current slave computer to execute the interaction information, where the interaction information is obtained and intercepted by the master computer when the master computer detects interaction initiated by the user with the master computer.

In the method for remote collaboration according to an embodiment of the present disclosure, the master computer firstly captures and transmits mouse operation information of a user to a receiving terminal, then the receiving terminal detects the position of the mouse cursor, and when the cursor arrives at the boundary of the master split screen and continues to move in the direction away from the master split screen, the receiving terminal detects the current split screen connecting to the boundary, and displays the cursor in the current split screen, thereafter the master computer continues to obtain and intercept interaction information of the user, and transfers, through the receiving terminal, the interaction information to the slave computer corresponding to the split screen where the mouse is currently located, finally the slave computer executes the interaction information, thus realizing collaboration function by determining the movement of the mouse based on the display of multiple sources on the same screen, allowing a user to use his own computer to control other people's computers that are being projected, in addition, since the user only needs to move the mouse for implementing the function, thus rendering the operations convenient.

Moreover, the method for remote collaboration in accordance with the above embodiments of the present disclosure may also have the following additional technical features:

further, in an embodiment of the present disclosure, after the step of the displaying the cursor on the current split screen, the method further includes:

transmitting a hide instruction to the master computer, so as to cause the master computer to hide the cursor in the master computer in accordance with the hide instruction, while causing the cursor to be hidden in the master split screen.

Further, in an embodiment of the present disclosure, the step of transferring the interaction information to a current slave computer corresponding to the current split screen includes:

receiving the interaction information which is obtained and intercepted by the master computer through API HOOK technology of an operating system; and transmitting the interaction information to the current slave computer corresponding to the current split screen.

Further, in an embodiment of the present disclosure, the step of causing the current slave computer to execute the interaction information specifically includes:

causing the current slave computer to simultaneously obtain the interaction information as well as the current slave computer's own interaction information, and to execute the interaction information as well as the current slave computer's own interaction information in accordance with a timing sequence.

Further, in an embodiment of the present disclosure, the interaction information includes one or more of mouse movement information, mouse click information and keyboard operation information, and the step of causing the current slave computer to execute the interaction information includes:

causing the current slave computer to execute the interaction information through a system interface.

Another embodiment of the present disclosure provides a system for remote collaboration for realizing remote collaboration in wireless screen transmission.

The system for remote collaboration in accordance with an embodiment of the present disclosure is applied in a receiving terminal, where the receiving terminal performs wireless screen transmission with a master computer and at least one slave computer simultaneously, and images of the master computer and all the slave computers are respectively and correspondingly displayed on a master split screen and other split screens of the receiving terminal, the system including:

a receiving module, to receive mouse operation information of a user in the master computer which is captured and transmitted by the master computer;

a detecting module, to detect a position of a mouse cursor on the master split screen in accordance with the mouse operation information, then when the cursor arrives at a boundary of the master split screen and continues to move in a direction away from the master split screen, detect the current split screen connecting to the boundary, and display the cursor on the current split screen; and a transferring module, to receive interaction information transmitted by the master computer, and transfer the interaction information to a current slave computer corresponding to the current split screen, so as to cause the current slave computer to execute the interaction information, where the interaction information is information which is obtained and intercepted by the master computer when the master computer detects interaction initiated by the user with the master computer.

Moreover, the system for remote collaboration in accordance with the above embodiments of the present disclosure may also have the following additional technical features:

further, in an embodiment of the present disclosure, the system further includes:

a hide instruction transmitting module, to transmit a hide instruction to the master computer, so as to cause the master computer to hide the cursor in the master computer in accordance with the hide instruction, while causing the cursor to be hidden in the master split screen.

Further, in an embodiment of the present disclosure, the transferring module is specifically to:

receive the interaction information which is obtained and intercepted by the master computer through API HOOK technology of an operating system;

transmit the interaction information to the current slave computer corresponding to the current split screen.

Further, in an embodiment of the present disclosure, the transferring module is also to:

cause the current slave computer to simultaneously obtain the interaction information as well as the current slave computer's own interaction information, and to execute the interaction information as well as the current slave computer's own interaction information in accordance with a timing sequence.

Further, in an embodiment of the present disclosure, the interaction information includes one or more of mouse movement information, mouse click information and keyboard operation information, and the transferring module is also to:

cause the current slave computer to execute the interaction information through a system interface.

Additional aspects and advantages of the present disclosure will be partly provided by the following description, partly become obvious therefrom, or be known through embodiments of the present disclosure.

BRIEF DESCRIPTION OF THE DRAWINGS

The above and/or additional aspects and advantages of embodiments of the present disclosure will become apparent and easy to understand from the following description of the embodiments in conjunction with the figures, where.

DESCRIPTION OF EMBODIMENTS

In order to make the purpose, technical solutions and advantages of embodiments of the present disclosure clearer, the technical solutions in the embodiments of the present disclosure will be described clearly and completely as follows in conjunction with drawings accompanying the embodiments of the present disclosure. And apparently, the described embodiments are just part rather than all of the embodiments of the present disclosure. All the other embodiments acquired by one with ordinary skill in the art based on the embodiments of the present disclosure without making creative efforts shall fall into the protection scope claimed by the present disclosure.

Figure 1:
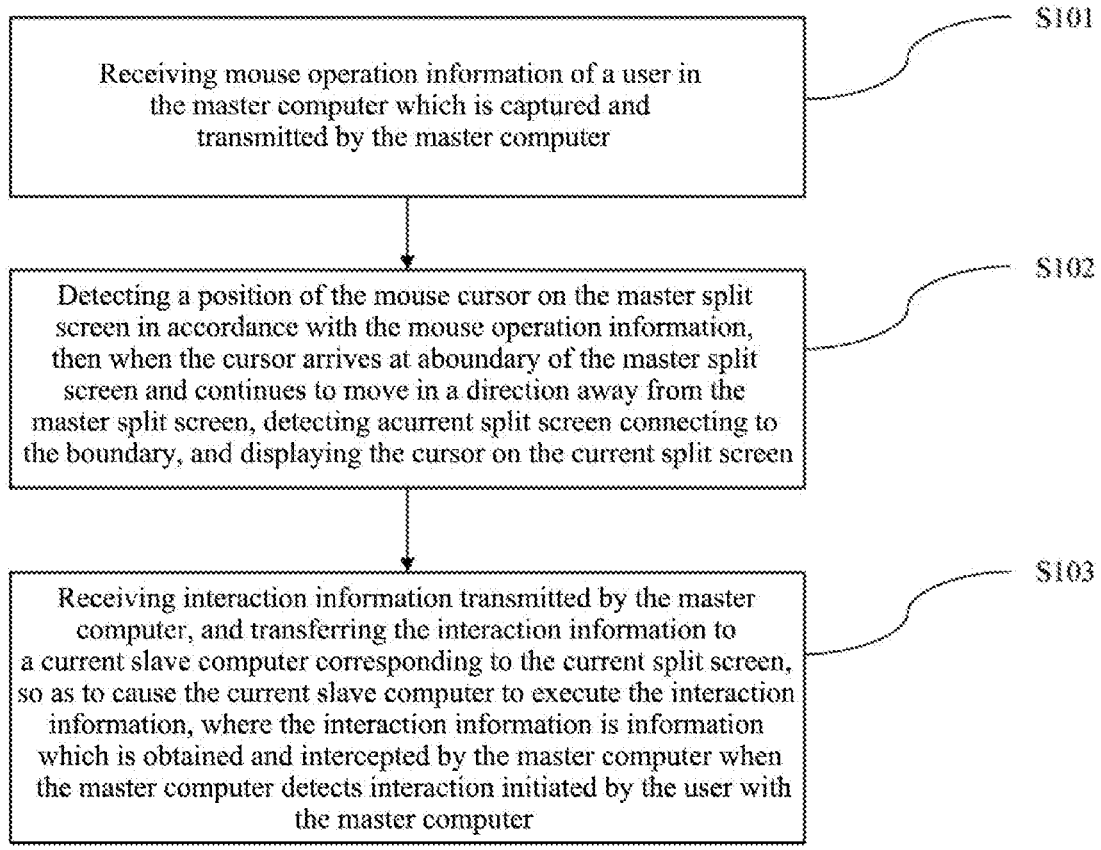
FIG. 1 is a flowchart of a method for remote collaboration in accordance with an embodiment of the present disclosure.
Figure 2:
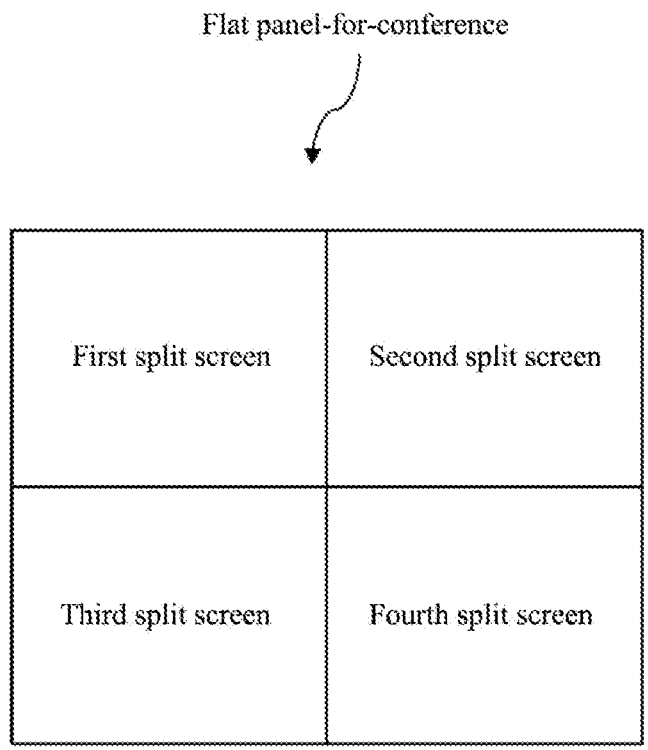
FIG. 2 is a distribution diagram for four split screens of a flat panel-for-conference in the method for remote collaboration in accordance with an embodiment of the present disclosure.

Referring to FIG. 1, a method for remote collaboration provided by an embodiment of the present disclosure is applied in a receiving terminal, where the receiving terminal performs wireless screen transmission with a master computer and at least one slave computer simultaneously, and images of the master computer and all the slave computers are respectively and correspondingly displayed on a master split screen and other split screens in the receiving terminal. In this embodiment, descriptions are made by taking an example where the receiving terminal is a flat panel-for-conference with a windows system or an Android system, in the case where there are three slave computers, and the images of the master computer and three slave computers are displayed on the flat panel-for-conference through wireless screen transmission in the form of four split screens, with the distribution of the four split screens shown in FIG.

2, where a first split screen, a second split screen, a third split screen and a fourth split screen respectively correspond to a master computer, a first slave computer, a second slave computer and a third slave computer; the distribution of the master computer, the first slave computer, the second slave computer and the third slave computer is operated and controlled by user 1, user 2, user 3 and user 4. In this embodiment, the method for remote collaboration at least includes the following steps:

S101, receiving mouse operation information of a user in the master computer which is captured and transmitted by the master computer;

where the master computer firstly captures the mouse operation information of the user in the master computer, after which the master computer transmits the mouse operation information to the flat panel-for-conference, where the mouse operation information mainly includes movement information of the mouse.

S102, detecting a position of the mouse cursor on the master split screen in accordance with the mouse operation information, then when the cursor arrives at a boundary of the master split screen and continues to move in a direction away from the master split screen, detecting a current split screen connecting to the boundary, and displaying the cursor on the current split screen.

Where the flat panel-for-conference detects the position of the mouse cursor on the first split screen in accordance with the mouse operation information, and when the cursor arrives at a boundary of the first split screen and continues to move in a direction away from the first split screen, the flat panel-for-conference detects the split screen connecting to the boundary, for example, when the cursor arrives at a right boundary of the first split screen, the flat panel-for-conference detects that the split screen connecting to the right boundary is the second split screen, and when the cursor continues to move towards the second split screen, the flat panel-for-conference displays the cursor on the second split screen. In addition, it should also be noted that in one special case, when the cursor arrives at a bottom-right point of the first split screen, the flat panel-for-conference detects that the connecting split screen includes the second split screen, the third split screen and the fourth split screen, in which case, the flat panel-for-conference is required to determine which split screen the cursor practically continues to move towards, so as to display the cursor on a corresponding split screen. In addition, it also needs to point out that in one special case, when the mouse arrives at a bottom-right point of the first split screen, the flat panel-for-conference detects that the connecting split screen includes the second split screen, the third split screen and the fourth split screen, in this case, the flat panel-for-conference is required to determine which split screen the mouse practically continues to move towards, so as to display the mouse on a corresponding split screen.

S103, receiving interaction information transmitted by the master computer, and transferring the interaction information to a current slave computer corresponding to the current split screen, so as to cause the current slave computer to execute the interaction information, where the interaction information is information which is obtained and intercepted by the master computer when the master computer detects interaction initiated by the user with the master computer.

Where the master computer continues to obtain interaction information of user 1 with the master computer, after which the master computer firstly intercepts the interaction information, thereby ensuring that the interaction information is executed by the master computer. Specifically, the interaction information includes one or more of mouse movement information, mouse click information, and keyboard operation information. In step S102, after going beyond the range of the first split screen, the cursor of the flat panel-for-conference enters one of the second split screen, the third split screen or the fourth split screen, and under the assumption that the cursor enters the range of the second split screen, the cursor will be displayed on the second split screen, at which point the master computer transfers the interaction information to the first slave computer corresponding to the second split screen through the flat panel-for-conference. In specific implementations, the master computer may firstly transmits the interaction information to the flat panel-for-conference through a wireless network, then the flat panel-for-conference forwards the interaction information to the first slave computer through the wireless network. For example, the interaction information is the mouse movement information, which specifically refers to that user 1 moves the mouse by (50, 50), indicating that the user controls the mouse to move 50 pixels both downwards and rightwards, and the mouse movement information may be transferred to the first slave computer after being encoded. After receiving the interaction information, the first slave computer may execute the interaction information forwarded from the flat panel-for-conference by calling a system interface (API), and if the interaction information is the keyboard operation information, then the first slave computer executes the corresponding keyboard operation information; and if the interaction information is to move the mouse by (50, 50), then the first slave computer controls the mouse to move 50 pixels both downwards and rightwards, and to be displayed on the second split screen at the same time, so as to realize a collaboration control of the first slave computer by user 1 on the master computer.

In the method for remote collaboration according to the embodiment of the present disclosure, the master computer firstly captures and transmits mouse operation information of a user to a receiving terminal, then the receiving terminal detects the position of the mouse cursor, and when the cursor arrives at the boundary of the master split screen and continues to move in the direction away from the master split screen, the receiving terminal detects the current split screen connecting to the boundary, and displays the cursor in the current split screen, after which the master computer continues to obtain and intercept interaction information of the user, and transfers, through the receiving terminal, the interaction information to a slave computer corresponding to the split screen where the mouse is currently located, finally the slave computer executes the interaction information, thus realizing collaboration function by determining the movement of the mouse based on the display of multiple sources on the same screen, allowing a user to use his own computer to control other people's computers that are being projected, in addition, since the user only needs to move the mouse for implementing the function, thus rendering the operations convenient.

In addition, in accordance with an example of the present disclosure, after step S102, the method for remote collaboration further includes:

transmitting a hide instruction to the master computer, so as to cause the master computer to hide the cursor in the master computer in accordance with the hide instruction, while causing the cursor to be hidden in the master split screen.

Where after controlling the cursor to be displayed on the second split screen, the flat panel-for-conference transmits the hide instruction to the master computer, so as to cause the master computer to hide the cursor, at which point, the cursor in the master computer is hidden, and the cursor in the corresponding first split screen is hidden as well. It should be noted that, to better achieve the collaboration effect, at this time, the mouse cursor of the first slave computer may also be hidden, which is also realized by the transition of the flat panel-for-conference, thus, eventually only one cursor is present on the first slave computer and the corresponding second split screen, and the cursor may be controlled by the user 1.

Figure 3:
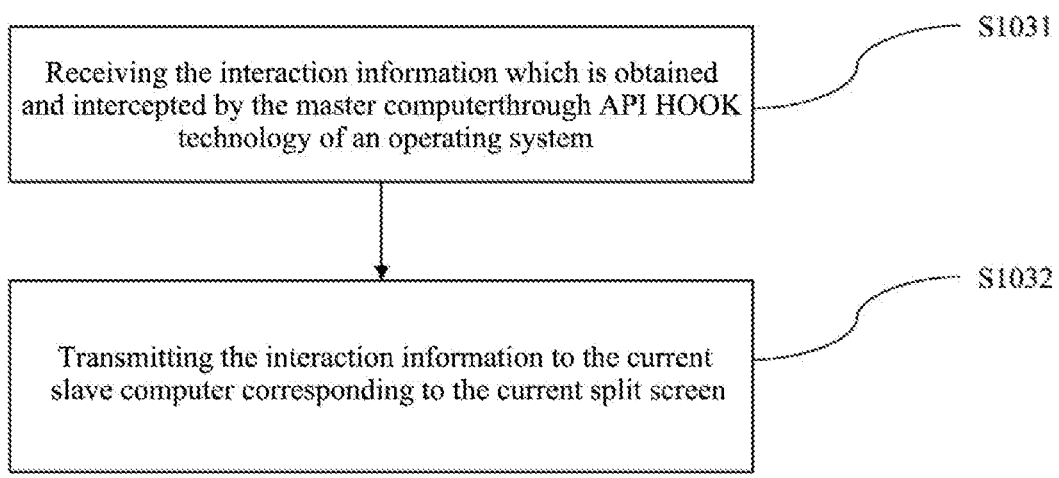
FIG. 3 is a flowchart for hiding a cursor in a method for remote collaboration in accordance with an embodiment of the present disclosure.

In addition, in accordance with an example of the present disclosure, referring to FIG. 3, step S103 specifically includes:

S1031, receiving the interaction information which is obtained and intercepted by the master computer through API HOOK technology of an operating system; and S1032, transmitting the interaction information to the current slave computer corresponding to the current split screen.

Where the master computer obtains and intercepts the interaction information of user 1 through API HOOK technology of the operating system, then transmits the interaction information obtained after interception to the flat panel-for-conference through a wireless network, e.g., Wi-Fi, after receiving the interaction information, the flat panel-for-conference transmits the interaction information to a slave computer corresponding to the split screen where the mouse is currently located, thus realizing the transferring of the interaction information.

In addition, in accordance with an example of the present disclosure, step S104 specifically includes:

causing the current slave computer to simultaneously obtain the interaction information as well as its own interaction information, and to execute the interaction information as well as its own interaction information in accordance with a timing sequence.

Where when user 1 controls the first slave computer through the master computer, if user 2 simultaneously transmits interaction information to the first slave computer, then at this time, the first slave computer executes the interaction information of user 1 and the interaction information of user 2 in accordance with a timing sequence, for example, user 1 inputs an "s" through a keyboard of the master computer, then user 2 inputs a "d" through a keyboard of the first slave computer, thus at this time, "sd" will be displayed on the second split screen. It should be noted that, since there is only one cursor on the first slave computer and the corresponding second split screen, if user 1 and user 2 simultaneously operate the mouse, the operation will lead to a combination of the two users' operations, and the process is consistent with QQ remote collaboration in the prior art, and will not be repeated herein.

A concrete application environment will be provided as follows, during the conference, user 1, user 2, user 3 and user 4 each start a screen transition software on their own computers for desktop transmission (wireless screen transmission), where desktop contents on each of the computers are transmitted to a flat panel-for-conference for being displayed on split screens. During presentation, if user 2 needs user 1 to perform certain operations to his own computer, user 1 is only required to move his mouse from his own split screen to user 2's split screen to realize the remote collaboration.

Figure 4:
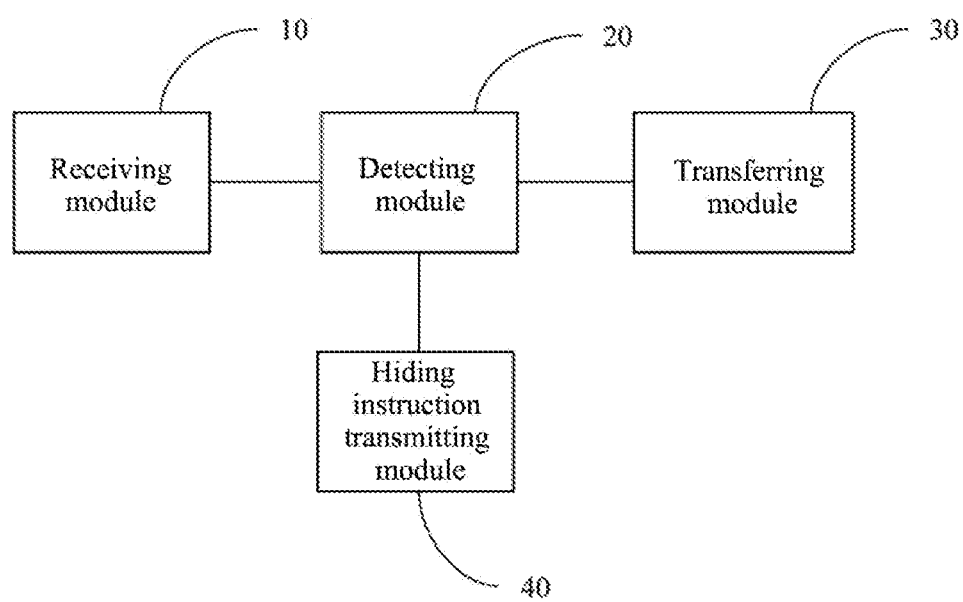
FIG. 4 is a structural diagram of a system for remote collaboration in accordance with another embodiment of the present disclosure.

Referring to FIG. 4, based on the same disclosure conception, a system for remote collaboration provided in another embodiment of the present disclosure is applied in a receiving terminal. The receiving terminal simultaneously performs wireless screen transmission with a master computer and at least one controlled computer, and images of the master computer and all the slave computers are respectively and correspondingly displayed on a master split screen and other split screens of the receiving terminal, the system including:

a receiving module 10, to receive mouse operation information of a user in the master computer which is captured and transmitted by the master computer;

a detecting module 20, to detect a position of the mouse cursor on the master split screen in accordance with the mouse operation information, then when the cursor arrives at a boundary of the master split screen and continues to move in a direction away from the master split screen, detect the current split screen connecting to the boundary, and display the cursor on the current split screen and a transferring module 30, to receive interaction information transmitted by the master computer, and transfer the interaction information to a current slave computer corresponding to the current split screen, so as to cause the current slave computer to execute the interaction information, where the interaction information is information which is obtained and intercepted by the master computer when the master computer detects interaction initiated by the user with the master computer.

In this embodiment, the system further includes:

a hide instruction transmitting module 40, to transmit a hide instruction to the master computer, after the detecting module 20 displays the cursor on the current split screen, so as to cause the master computer to hide the cursor in the master computer in accordance with the hide instruction, while causing the cursor to be hidden in the master split screen.

In this embodiment, the transferring module 30 is specifically to:

receive the interaction information which is obtained and intercepted by the master computer through API HOOK technology of an operating system; and transmit the interaction information to the current slave computer corresponding to the current split screen.

In this embodiment, the transferring module 30 is further to:

cause the current slave computer to simultaneously obtain the interaction information as well as the current slave computer's own interaction information, and to execute the interaction information as well as the current slave computer's own interaction information in accordance with a timing sequence.

In this embodiment, the interaction information includes one or more of mouse movement information, mouse click information and keyboard operation information, and the transferring module 30 is further to:

cause the current slave computer to execute the interaction information through a system interface.

The technical features and technical effects of the system for remote collaboration provided by the embodiments of the present disclosure are the same as those in the method provided by the embodiments of the present disclosure, and will not be repeated herein.

Logics and/or steps illustrated in the flowcharts or described herein in other manners, for example, may be regarded as an ordered list of executable instructions for realizing a logic function, and may be specifically implemented in any computer readable medium, for use by the instruction executing systems, apparatuses or devices (for example, computer-based systems, systems including a processor, or other systems that are capable of accessing instructions from instruction executing system, apparatuses or devices and executing the instructions), or for use in conjunction with these instruction executing systems, apparatuses or devices. As to the present specification, the "computer readable medium" may be any apparatus which may include, store, communicate, propagate or transmit programs for use by instructions executing systems, apparatuses or devices, or for use in conjunction with the instruction executing systems, apparatuses or devices More specific examples (a non-exhaustive list) of the computer readable medium include: an electric connection section (electronic apparatus) with one or more wirings, a portable computer disk cartridge (magnetic apparatus), a random access memory (RAM), a read-only memory (ROM), an erasable programmable read-only-memory (EPROM or flash memory), an optical fiber apparatus, and a portable compact disc read-only memory (CDROM). In addition, the computer readable medium may even be a paper or other proper medium on which the program may be printed, because the program may be obtained in an electronic manner, for example, by optically scanning paper or other media, followed by editing, interpretation or by processing in other proper manners, if necessary, then by storing in a computer memory.

It should be understood that, the parts of the present disclosure may be realized through hardware, software, firmware or a combination thereof. In the above implementations, multiple steps or methods may be implemented using software or firmware stored in a memory and executed by a proper instruction executing system. For example, if hardware is employed for the implementation as in another implementation, any of the following known technologies in the prior art or a combination thereof may be used in implementation: a discrete logic circuit with a logical gating circuit for implementing a logic function of data signals, and an application specific integrated circuit with a proper combined logical gating circuits, a programmable gate array (PGA), as well as a field programmable gate array (FPGA) and the like.

In the description of the present specification, description concerning the reference terms "one embodiment", "some embodiments", "example", "specific example", or "some examples" means that the specific feature, structure, material or feature described in conjunction with the embodiments or examples is included in at least one embodiment or example of the present disclosure. In the present specification, the schematic expression of the above terms does not necessarily refer to the same embodiment or example. Moreover, the described specific feature, structure, material or feature may be combined in any one or multiple embodiments or examples in a proper manner.

Although the embodiments of the present disclosure have been illustrated and described, those skilled in the art may understand that various changes, modifications, substitutions and variations may be made to these embodiments without departing from the principle and purpose of the present disclosure, and the scope of the present disclosure may be defined by the claims and equivalents thereof.

The invention claimed is:

1. A method for remote collaboration, wherein the method is applied in a receiving terminal, the receiving terminal performs wireless screen transmission with at least two computers simultaneously, and images of the at least two computers are respectively and correspondingly displayed on a master split screen and other split screens of the receiving terminal, the method comprising:

receiving, by the receiving terminal, mouse operation information captured and transmitted by a master computer, wherein the master computer is one of the at least two computers, and any computer other than the master computer of the at least two computers is a slave computer;

detecting a position of a mouse cursor on the master split screen of the receiving terminal in accordance with the mouse operation information;

responsive to detecting that the cursor arrives at a boundary of the master split screen of the receiving terminal and continues to move in a direction away from the master split screen of the receiving terminal, detecting a current split screen of the receiving terminal connecting to the boundary, and displaying the cursor on the current split screen of the receiving terminal; and receiving interaction information transmitted by the master computer, by the receiving terminal, and transferring the interaction information to a current slave computer corresponding to the current split screen of the receiving terminal, and causing the current slave computer to execute the interaction information, wherein the interaction information is information which is obtained and intercepted by the master computer when the master computer detects interaction initiated by a user with the master computer.

2. The method for remote collaboration according to claim 1, wherein, the interaction information comprises at least one of mouse movement information, mouse click information, or keyboard operation information, and the step of causing the current slave computer to execute the interaction information comprises:

causing the current slave computer to execute the interaction information through a system interface.

3. The method for remote collaboration according to claim 1, subsequent to displaying the cursor on the current split screen, further comprising:

transmitting a hide instruction to the master computer to cause the master computer to hide the cursor in the master computer in accordance with the hide instruction and to cause the cursor to be hidden in the master split screen of the receiving terminal.

4. The method for remote collaboration according to claim 3, wherein, the transferring the interaction information to a current slave computer corresponding to the current split screen further comprises:

receiving the interaction information which is obtained and intercepted by the master computer through an application program interface (API) of an operating system; and transmitting the interaction information to the current slave computer corresponding to the current split screen.

5. The method for remote collaboration according to claim 4, wherein, the causing the current slave computer to execute the interaction information further comprises:

causing the current slave computer to simultaneously obtain the interaction information and the current slave computer's own interaction information, and to execute the interaction information and the current slave computer's own interaction information in accordance with a timing sequence.

6. A system for remote collaboration, comprising:

a receiving terminal to perform wireless screen transmission with at least two computers simultaneously, wherein images of the at least two computers are respectively and correspondingly displayed on a master split screen and other split screens of the receiving terminal, the receiving terminal comprising:

a receiving module, to receive mouse operation information captured and transmitted by a master computer, wherein the master computer is one of the at least two computers, and any computer other than the master computer of the at least two computers is a slave computer;

a detecting module, to detect a position of a mouse cursor on the master split screen of the receiving terminal in accordance with the mouse operation information, and responsive to detecting that the cursor arrives at a boundary of the master split screen of the receiving terminal and continues to move in a direction away from the master split screen of the receiving terminal, detect a current split screen of the receiving terminal connecting to the boundary, and display the cursor on the current split screen of the receiving terminal; and a transferring module, to receive interaction information transmitted by the master computer, and transfer the interaction information to a current slave computer corresponding to the current split screen of the receiving terminal, and to cause the current slave computer to execute the interaction information, wherein the interaction information is information which is obtained and intercepted by the master computer when the master computer detects interaction initiated by a user with the master computer.

7. The system for remote collaboration according to claim 6, wherein, the interaction information comprises at least one of mouse movement information, mouse click information, or keyboard operation information, and the transferring module is further to:
cause the current slave computer to execute the interaction information through a system interface.

8. The system for remote collaboration according to claim 6, wherein, the system further comprises:

a hide instruction transmitting module, to transmit a hide instruction to the master computer to cause the master computer to hide the cursor in the master computer in accordance with the hide instruction and to cause the cursor to be hidden in the master split screen of the receiving terminal.

9. The system for remote collaboration according to claim 8, wherein, the transferring module is specifically to:

receive the interaction information which is obtained and intercepted by the master computer through an application program interface (API) of an operating system; and transmit the interaction information to the current slave computer corresponding to the current split screen.

10. The system for remote collaboration according to claim 9, wherein, the transferring module is further to:

cause the current slave computer to simultaneously obtain the interaction information and the current slave computer's own interaction information, and to execute the interaction information and the current slave computer's own interaction information in accordance with a timing sequence.

* * * * *